(12) United States Patent
Yu et al.

(10) Patent No.: US 6,970,226 B2
(45) Date of Patent: Nov. 29, 2005

(54) LIQUID CRYSTAL DISPLAY HAVING VACUUM LAYER FOR ISOLATING HEAT

(75) Inventors: Chuan-Pei Yu, I-Lan Hsien (TW); Han-Chou Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 26 days.

(21) Appl. No.: 10/708,275

(22) Filed: Feb. 20, 2004

(65) Prior Publication Data

US 2004/0165124 A1   Aug. 26, 2004

(30) Foreign Application Priority Data

Feb. 21, 2003   (TW) .............................. 92103719 A

(51) Int. Cl.[7] .......................................... G02F 1/1335
(52) U.S. Cl. ........................................ 349/161; 349/64
(58) Field of Search .................... 349/161, 64; 313/17, 313/25–27

(56) References Cited

U.S. PATENT DOCUMENTS

| | | | | |
|---|---|---|---|---|
| 4,748,546 A | * | 5/1988 | Ukrainsky | 362/223 |
| 5,432,626 A | * | 7/1995 | Sasuga et al. | 349/58 |
| 5,461,547 A | * | 10/1995 | Ciupke et al. | 362/31 |
| 5,467,417 A | * | 11/1995 | Nakamura et al. | 385/36 |
| 5,844,364 A | * | 12/1998 | Beardmore | 313/522 |
| 6,667,567 B2 | * | 12/2003 | Fujishiro | 313/46 |

FOREIGN PATENT DOCUMENTS

| | | |
|---|---|---|
| JP | 4-79330 | 7/1992 |
| JP | 8-334780 | 12/1996 |
| JP | 2001-265235 | 9/2001 |

\* cited by examiner

*Primary Examiner*—Andrew Schechter
(74) *Attorney, Agent, or Firm*—Winston Hsu

(57) ABSTRACT

A liquid crystal display includes a backlight unit and a liquid crystal display panel. The backlight unit contains an optical film positioned above a light source, and the optical film at least includes a vacuum layer for isolating heat generated by the light source. The liquid crystal display panel positioned above the optical film includes a plurality of pixel units.

11 Claims, 4 Drawing Sheets

LIQUID CRYSTAL DISPLAY HAVING VACUUM LAYER FOR ISOLATING HEAT

Liquid crystal display having vacuum layer for isolating heat.

BACKGROUND OF INVENTION

1. Field of the Invention

The present invention relates to a liquid crystal display (LCD).

2. Description of the Prior Art

With low prices and high quality of liquid crystal displays (LCDs), the LCD is widely applied in notebooks, PDAs, mobile phones, clocks and watches, digital video cameras, digital cameras, TVs, and so on. In general, an LCD comprises a display panel and a backlight unit. The backlight unit positioned under the display panel includes a light source and an optical film for uniformly providing light for the display panel. Consequently, the pixel units of the display panel are able to display images. Therein, a direct-type backlight unit having a light source directly under the display panel can be applied for high illumination requirement LCDs or large size LCDs, such as computer monitors or TV panels.

Referring to FIG. 1, it shows a sectional view of a prior art LCD 10. The prior art LCD 10 comprises a liquid crystal display panel 12 and a backlight unit 14 positioned under the liquid crystal display panel 12. The liquid crystal display panel 12 comprises a plurality of pixel units (not shown in FIG. 1), and the backlight unit 14 comprises a light source 16, an optical film 18 positioned between the light source 16 and the liquid crystal display panel 12, and a reflecting sheet 20 positioned under the light source and fixed on a housing 22. The light source 16 is used for illuminating light to the liquid crystal display panel 12, and the reflecting sheet 20 is used for reflecting the light generated by the light source 16 so as to improve the light utility rate and provide a better illumination. The optical film 18 includes a diffuser sheet 24, a prism sheet 26, diffuser sheet and a diffusion plate 28. The reflecting sheet 20 has a plurality of printing points 29 distributed on its surface for uniformly scattering the light generated by the light source 16 on the liquid crystal display panel 12. The diffusion plate 24 and the prism 26 are used for further modifying the difference of light intensity. Therefore, the liquid crystal display panel 12 can receive light with uniform intensity.

Following the tendency of high illumination, the light source 16 of the backlight unit 14 usually includes a plurality of cathode fluorescent tubes 17 assembled in a narrow, sealed space, and the heat generated by the cathode fluorescent tubes 17 does not disperse to outside. When the LCD 10 is operated for a long time, the temperature near the cathode fluorescent tubes 17 will arise excessively high, which affects functions of the LCD 10 and results in low display quality. Furthermore, the optical film 18 positioned adjacent to the light source 16 will easily become deformed, which results in a reduction of product life. When the LCD 10 integrated with wide visual angle technology is applied for TV products, the numbers and the electric currents of cathode fluorescent tubes 17 of the light source 16 are increased according to the present method for maintaining high illumination. However, the above-mentioned method also increases the heat generated by the light source 16, and the problem of heat dispersion of the backlight unit 14 gets worse.

SUMMARY OF INVENTION

It is therefore an object of the present invention to provide a backlight unit comprising a vacuum layer for separating heat generated by the light source so as to solve the above-mentioned problems.

According to the present invention, a liquid crystal display comprises a backlight unit and a liquid crystal display panel. The backlight unit comprises an optical film positioned above a light source, and the optical film at least includes a vacuum layer for isolating heat generated by the light source. The liquid crystal display panel is positioned above the optical film The LCD according to the present invention includes a vacuum layer positioned between the liquid crystal display panel and the light source. The vacuum layer is formed of transparent materials, and the inner gases of the transparent materials are drawn out by vacuum treatment. Consequently, the vacuum layer is able to isolate the heat generated by the light source by reducing heat convection. Because light can pass through the vacuum, the optical characteristics of the backlight unit are not affected by the vacuum layer. In contrast to the prior art LCD, the LCD of the present invention effectively improves the problem of heat dispersion of the backlight unit. Therefore, the heat generated by the light source is prevented from being conducted to the optical film and the liquid crystal display panel, and the display quality of the LCD are further increased.

These and other objects of the present invention will be apparent to those of ordinary skill in the art after reading the following detailed description of the preferred embodiments, which are illustrated in the multiple figures and drawings.

DETAILED DESCRIPTION

Figure 1:
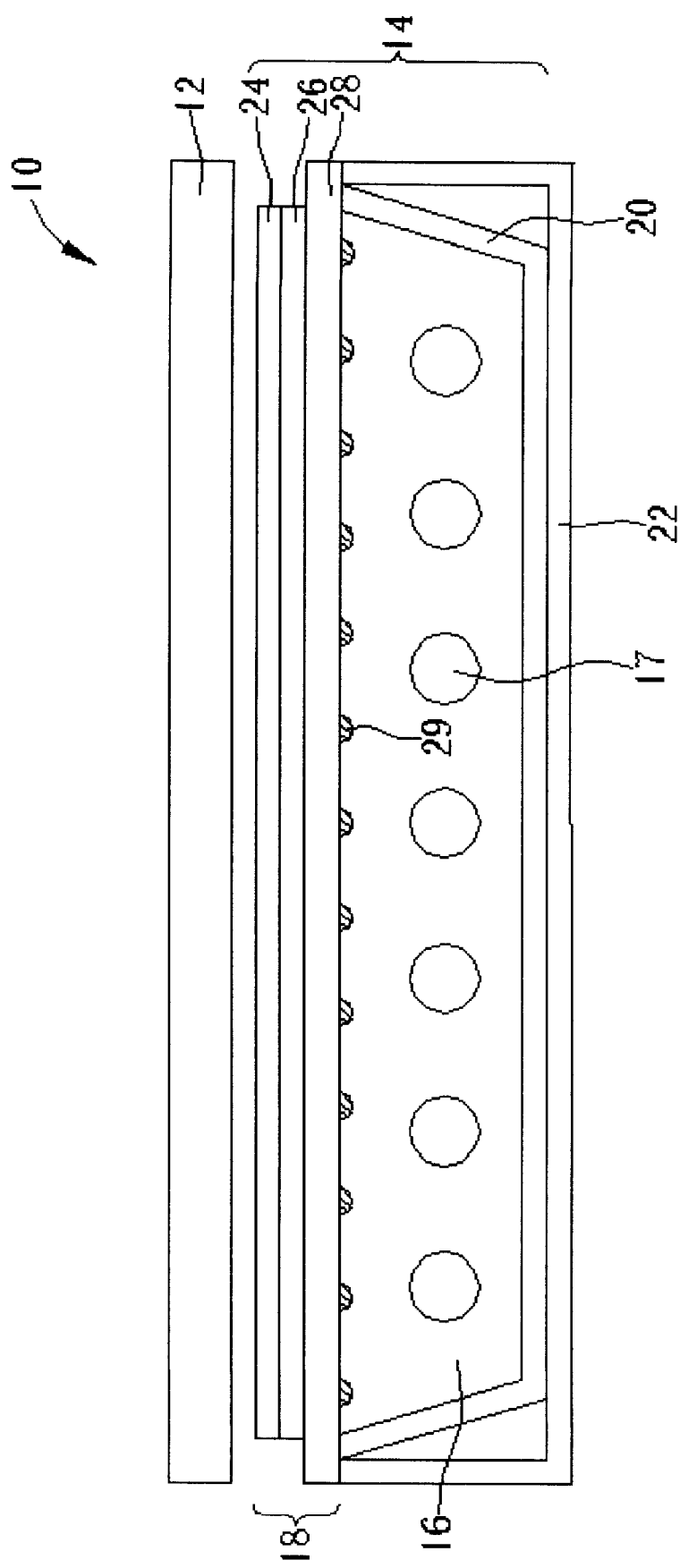
FIG. 1 is a sectional view of a prior art LCD.
Figure 2:
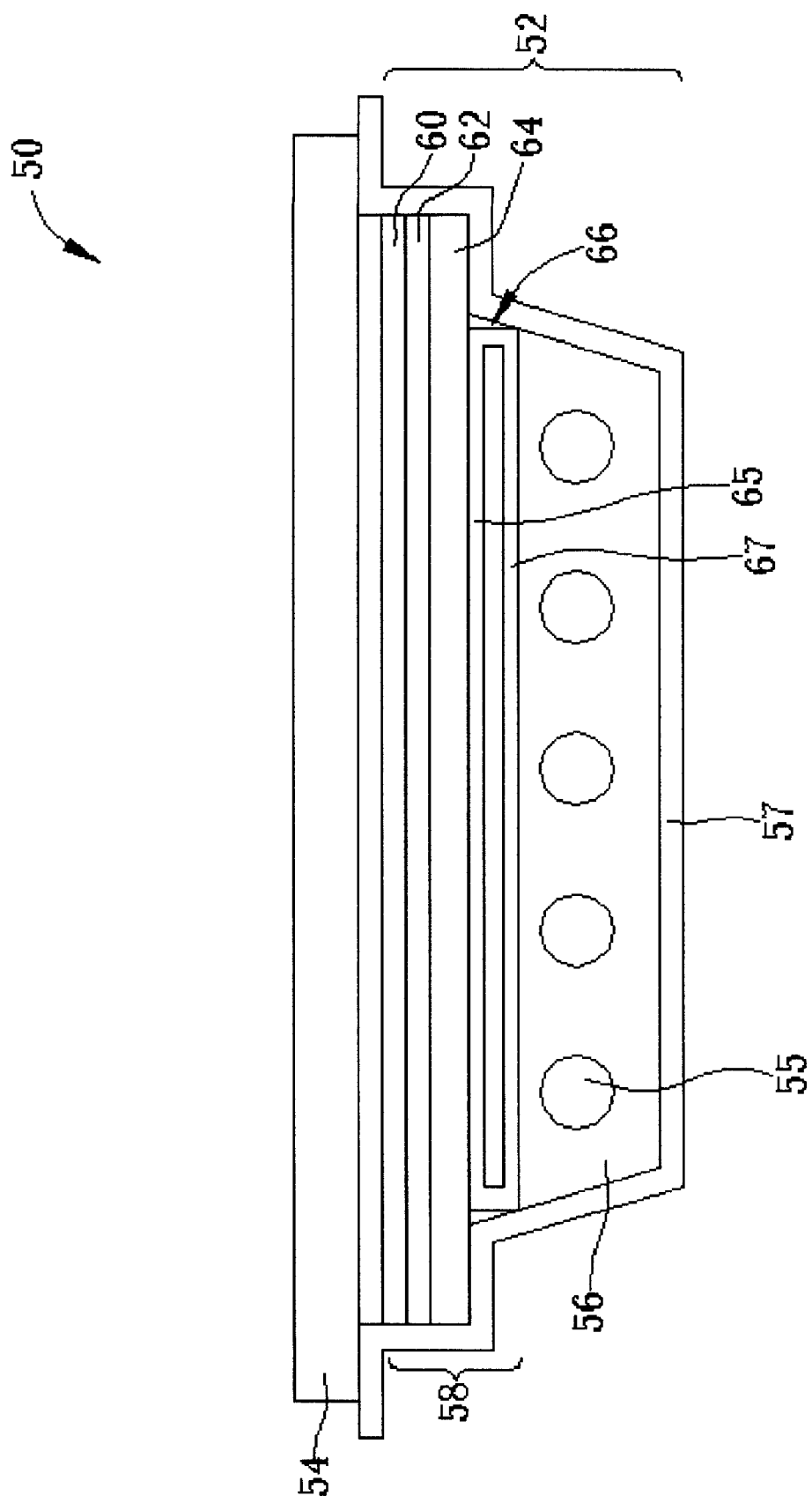
FIG. 2 is a sectional view of an LCD according to the first embodiment of the present invention.

Referring to FIG. 2, it shows a sectional view of an LCD 50 according to the first embodiment of the present invention. As shown in FIG. 2, the LCD 50 comprises a backlight unit 52 and a liquid crystal display panel 54. The backlight unit 52 comprises an optical film 58 positioned above a light source 56. The emitting devices of the light source 56 include a cold cathode fluorescent light (CCFL), a hot cathode fluorescent light, an external electrode cold cathode fluorescent light, and a cold cathode flat fluorescence lamp (CCFFL). The liquid crystal display panel 54 is positioned above the optical film 58. Additionally, a reflecting sheet 57 is positioned under the light source 56 and used for reflecting the light generated by the light source 56 so as to provide the liquid crystal display panel 54 with better illumination.

According to the first embodiment of the present invention, the optical film 58 includes a diffusion film 60, a prism 62, a diffusion plate 64, a DBEF and a vacuum layer 66. The numbers of the diffusion film 60, the prism 62, and the diffusion plate 64 that are used for uniformly scattering the light generated by the light source 56 on the liquid crystal display panel 54 can be increased according to requirements.

Therefore, the liquid crystal display panel 54 can receive light with uniform intensity. The vacuum layer 66 includes an upper plate 65 and a lower plate 67 both formed of transparent materials, such as glass, acrylic, and polycarbonate (PC), and the upper plate 65 and the lower plate 67 enclose a vacuum. Consequently, the vacuum layer 66 is able to isolate the heat generated by the light source 56 by reducing heat convection. Furthermore, the heat is prevented from being conducted to the optical film 58 and the liquid crystal display panel 54 for avoiding the deformation of the optical film 58 and the damage to the liquid crystal display panel 54. The vacuum layer 66 of the LCD 50 is positioned between the diffusion plate 64 and the light source 56. However, the vacuum layer 66 also can be formed and integrated with the diffusion plate 64 by using the upper plate 65 or the lower plate 67 of the vacuum layer 66 to replace the function of the diffusion plate 64. Additionally, a heat sink (not shown in FIG. 2) is also positioned under the light source 56 for enhancing the heat dispersion of the backlight unit 52.

Figure 3:
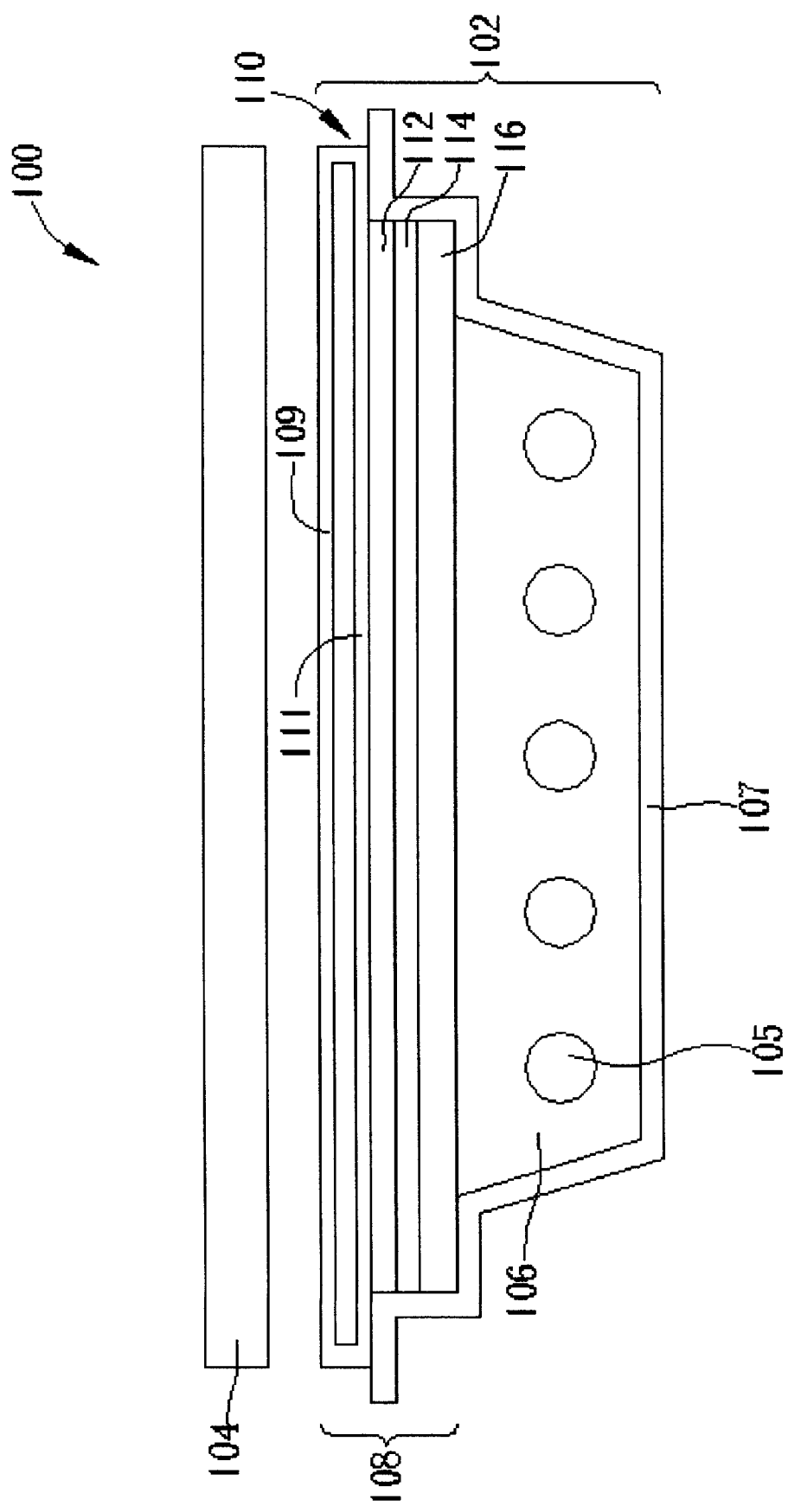
FIG. 3 is a sectional view of an LCD according to the second embodiment of the present invention.

Referring to FIG. 3, it shows a sectional view of an LCD 100 according to the second embodiment of the present invention. As shown in FIG. 3, the LCD 100 comprises a backlight unit 102 and a liquid crystal display panel 104. The backlight unit 102 comprises an optical film 108 positioned above a light source 106. The emitting devices of the light source 106 include a cold cathode fluorescent light, a hot cathode fluorescent light, an external electrode cold cathode fluorescent light, and a cold cathode flat fluorescence lamp. The liquid crystal display panel 104 is positioned above the optical film 108. Additionally, a reflecting sheet 107 is positioned under the light source 106 and used for reflecting the light generated by the light source 106 so as to provide the liquid crystal display panel 104 with better illumination.

According to the second embodiment of the present invention, the optical film 108 includes a vacuum layer 110, a diffusion film 112, a prism 114, and a diffusion plate 116. The numbers of the diffusion film 112, the prism 114, and the diffusion plate 116 that are used for uniformly scattering the light generated by the light source 106 on the liquid crystal display panel 104 can be increased according to requirements. Therefore, the liquid crystal display panel 104 can receive light with uniform intensity. The vacuum layer 110 includes an upper plate 109 and a lower plate 111 both formed of transparent materials, such as glass, acrylic, and polycarbonate, and the upper plate 109 and the lower plate 111 enclose a vacuum. Consequently, the vacuum layer 110 is able to isolate the heat generated by the light source 106 by reducing heat convection. Furthermore, the heat is prevented from being conducted to the liquid crystal display panel 104 for avoiding the damage to the liquid crystal display panel 104. The vacuum layer 110 of the LCD 100 is positioned between the liquid crystal display panel 104 and the diffusion film 112. However, the vacuum layer 110 also can be formed on the under surface of the liquid crystal display panel 104 for integrating the fabrication of the vacuum layer 110 and the liquid crystal display panel 104. Additionally, a heat sink (not shown in FIG. 3) is also positioned under the light source 106 for enhancing the heat dispersion of the backlight unit 102.

Figure 4:
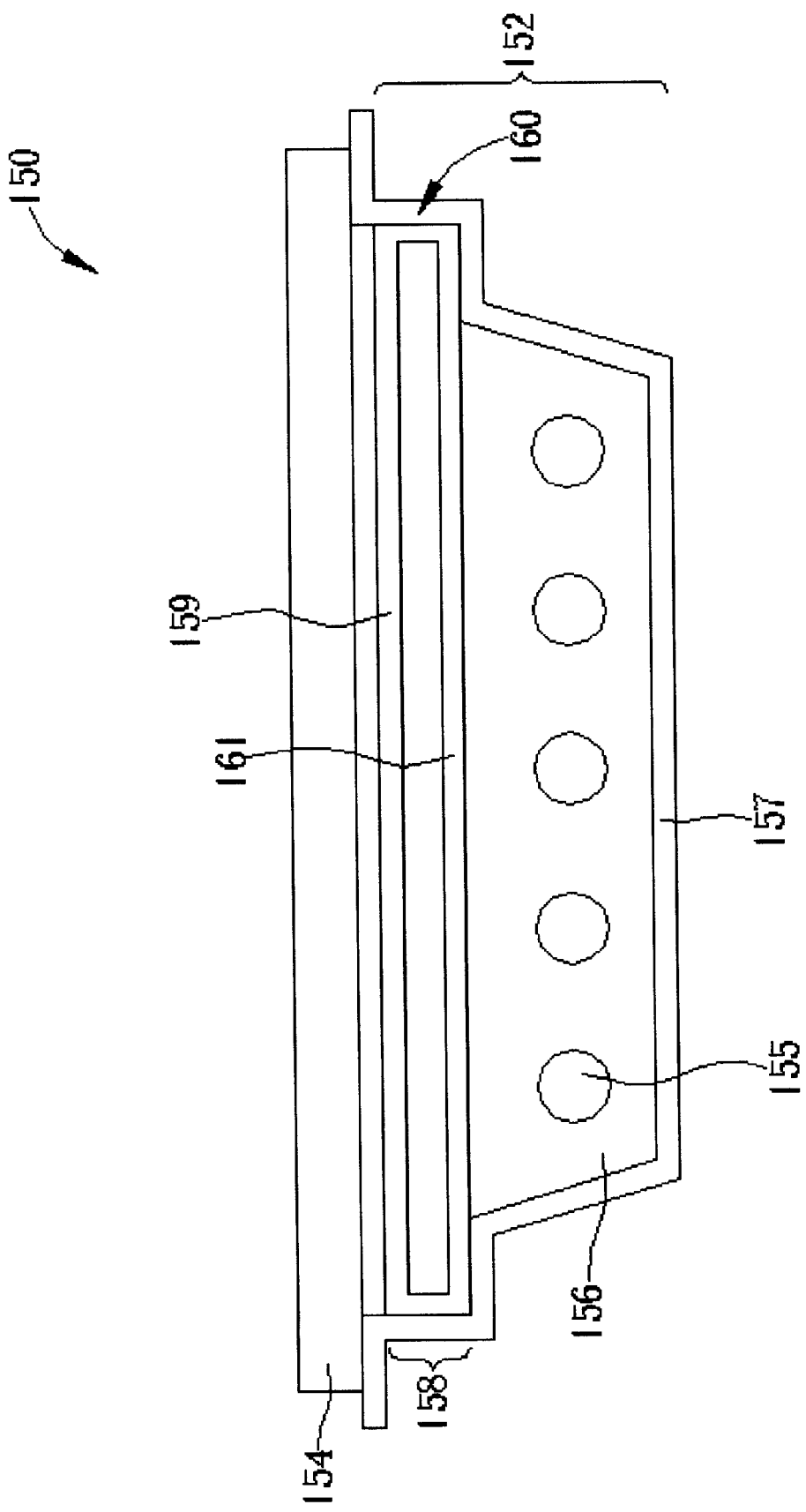
FIG. 4 is a sectional view of an LCD according to the third embodiment of the present invention.

Referring to FIG. 4, it shows a sectional view of an LCD 150 according to the third embodiment of the present invention. As shown in FIG. 4, the LCD 150 comprises a backlight unit 152 and a liquid crystal display panel 154. The backlight unit 152 comprises an optical film 158 positioned above a light source 156. The emitting devices of the light source 156 include a cold cathode fluorescent light, a hot cathode fluorescent light, an external electrode cold cathode fluorescent light, and a cold cathode flat fluorescence lamp. The liquid crystal display panel 154 comprising a plurality of pixel units (not shown in FIG. 4) is positioned above the optical film 158. Additionally, a reflecting sheet 157 is positioned under the light source 156 and used for reflecting the light generated by the light source 156 so as to provide the liquid crystal display panel 154 with better illumination.

According to the third embodiment of the present invention, the optical film 158 includes a vacuum layer 160. The vacuum layer 160 includes an upper plate 159 and a lower plate 161 both formed of transparent materials, such as glass, acrylic, and polycarbonate, and the upper plate 159 and the lower plate 161 enclose a vacuum. Consequently, the vacuum layer 160 is able to isolate the heat generated by the light source 156 by reducing heat convection. Furthermore, the heat is prevented from being conducted to the liquid crystal display panel 154 for avoiding the damage to the liquid crystal display panel 154. The upper plate 159 of the vacuum layer 160 is used as a diffusion plate, and the lower plate 161 of the vacuum layer 160 is used as a prism. As well, the upper plate 159 of the vacuum layer 160 can function as a prism, and the lower plate 161 of the vacuum layer 160 can function as a diffusion plate based on different designs. The vacuum layer 160 is combined with the diffusion plate and the prism used for uniformly scattering the light generated by the light source 156 on the liquid crystal display panel 154, then the liquid crystal display panel 154 can receive light with uniform intensity. Additionally, a heat sink (not shown in FIG. 4) is also positioned under the light source 156 for enhancing the heat dispersion of the backlight unit 152.

The LCD of the present invention has a vacuum layer positioned between the liquid crystal display panel and the light source. The vacuum layer is formed of transparent materials, and the inner gases of the transparent materials are drawn out by vacuum treatment. Consequently, the vacuum layer is able to isolate the heat generated by the light source by reducing heat convection. Because light can pass through the vacuum, the optical characteristics of the backlight unit are not affected by the vacuum layer. In contrast to the prior art LCD, the LCD of the present invention effectively improves the problem of heat dispersion of the backlight unit. Therefore, the heat generated by the light source is prevented from being conducted to the optical film and the liquid crystal display panel, and the display quality and product life of the LCD are further increased.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A liquid crystal display comprising:
 a backlight unit comprising:
  an optical film positioned above a light source, the optical film including a vacuum layer, a diffusion film, a prism, and a diffusion plate; and
 a liquid crystal display panel positioned above the optical film;
  wherein the vacuum layer is used for isolating heat generated by the light source.

2. The liquid crystal display of claim 1, wherein the vacuum layer includes an upper plate and a lower plate both formed of transparent materials, and the upper plate and the lower plate enclose a vacuum.

3. The liquid crystal display of claim 2, wherein the transparent materials are selected from the group consisting of glass, acrylic and polycarbonate (PC).

4. The liquid crystal display of claim 2, wherein the upper plate is used as a prism.

5. The liquid crystal display of claim 2, wherein the lower plate is used as a diffusion plate.

6. The liquid crystal display of claim 2, wherein the upper plate is used as a diffusion plate.

7. The liquid crystal display of claim 2, wherein the lower plate is used as a prism.

8. The liquid crystal display of claim 1, wherein the vacuum layer is positioned between the diffusion plate and the light source.

9. The liquid crystal display of claim 1, wherein the vacuum layer is positioned between the liquid crystal display panel and the diffusion plate.

10. The liquid crystal display of claim 1, further comprising a reflecting sheet and a heat sink positioned under the light source.

11. The liquid crystal display of claim 1, wherein light-emitting devices of the light source are selected from the group consisting of cold cathode fluorescent light (CCFL), hot cathode fluorescent light, external electrode cold cathode fluorescent light, and cold cathode flat fluorescence lamp (CCFFL).

* * * * *